United States Patent [19]

Patton et al.

[11] Patent Number: 4,674,011
[45] Date of Patent: Jun. 16, 1987

[54] ALIGNMENT REFERENCE DEVICE

[75] Inventors: Gail Y. Patton, Sunnyvale; Darrel D. Torgerson, Palo Alto, both of Calif.

[73] Assignee: The United States of America as represented by the Secretary of the Air Force, Washington, D.C.

[21] Appl. No.: 907,345

[22] Filed: Sep. 10, 1986

[51] Int. Cl.$^4$ .......................... F21V 7/04; F21V 29/00
[52] U.S. Cl. ..................... 362/32; 362/259; 362/294; 362/308; 362/328; 362/334
[58] Field of Search ............... 362/32, 259, 294, 308, 362/328, 334; 350/96.15

[56] References Cited

U.S. PATENT DOCUMENTS

| 2,309,788 | 2/1943 | Ramberg | 362/308 |
| 2,589,569 | 3/1952 | Peter | 362/32 |
| 2,784,640 | 3/1957 | Le Reche et al. | 356/125 |
| 3,122,602 | 2/1964 | Page | 362/308 |
| 3,918,814 | 11/1975 | Weiser | 356/375 |
| 4,011,403 | 3/1977 | Epstein | 362/32 |

FOREIGN PATENT DOCUMENTS 2082 6/1982 Int'l Pat. Institute ............... 362/32

Primary Examiner—Douglas Hart
Attorney, Agent, or Firm—Stanton E. Collier; Donald J. Singer

[57] ABSTRACT

An alignment reference device provides a collimated laser beam that minimizes angular deviations therein. A laser beam source outputs the beam into a single mode optical fiber. The output end of the optical fiber acts as a source of radiant energy and is positioned at the focal point of a lens system where the focal point is positioned within the lens. The output beam reflects off a mirror back to the lens that produces a collimated beam.

2 Claims, 5 Drawing Figures

ALIGNMENT REFERENCE DEVICE

STATEMENT OF GOVERNMENT INTEREST

The invention described herein may be manufactured and used by or for the Government for governmental purposes without the payment of any royalty thereon.

BACKGROUND OF THE INVENTION

The present invention relates to collimated light sources, and, in particular, relates to collimated light source used as a reference source.

Prior reference sources using a collimated beam have traditionally placed a source of light at the focal point of a system of lens. This has several disadvantages. If the lens system has a long focal length, the source-to-lens system path may have to be folded several times in order to reach a compact system. This also introduces a greater possibility of having the reference source move relative to the lens system which is clearly undesireable. Also, the folding operation introduces other optical surfaces which can distort the shape of the collimated beam.

If one shortens the focal length to lessen the above problem other desireable features are introduced such as a complicated lens surface to produce a collimated beam.

The present invention is directed toward providing an alignment reference assembly in which these undesireable characteristics are minimized.

SUMMARY OF THE INVENTION

The present invention sets forth an alignment reference assembly overcoming the problems noted hereinabove.

The present invention includes a source of radiant energy such as a laser diode that outputs energy into a single mode optical fiber. The output end of the optical fiber is mounted inside the lens system at the focal point. In the present invention, the focal point is folded back into the lens system by means of mirrors. Thus, both the lens system and the output end of the optical fiber are fixed with respect to each other. Although the mirrors may shift in position, either parallel to the lens system axis or perpendicular thereto, only the parallel movement would affect the coincidence of the focal point and the output end of the optical fiber.

It is therefore one object of the present invention to provide a collimated beam for use as a reference source having minimal angular deviations as a result of movement.

It is therefore another object of the present invention to provide a reference source wherein the focal point is located within the lens.

It is therefore another object of the present invention to provide a reference source having a laser diode outputting radiant energy onto a single mode optical fiber that has an output end embeded within the lens system at the focal point.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
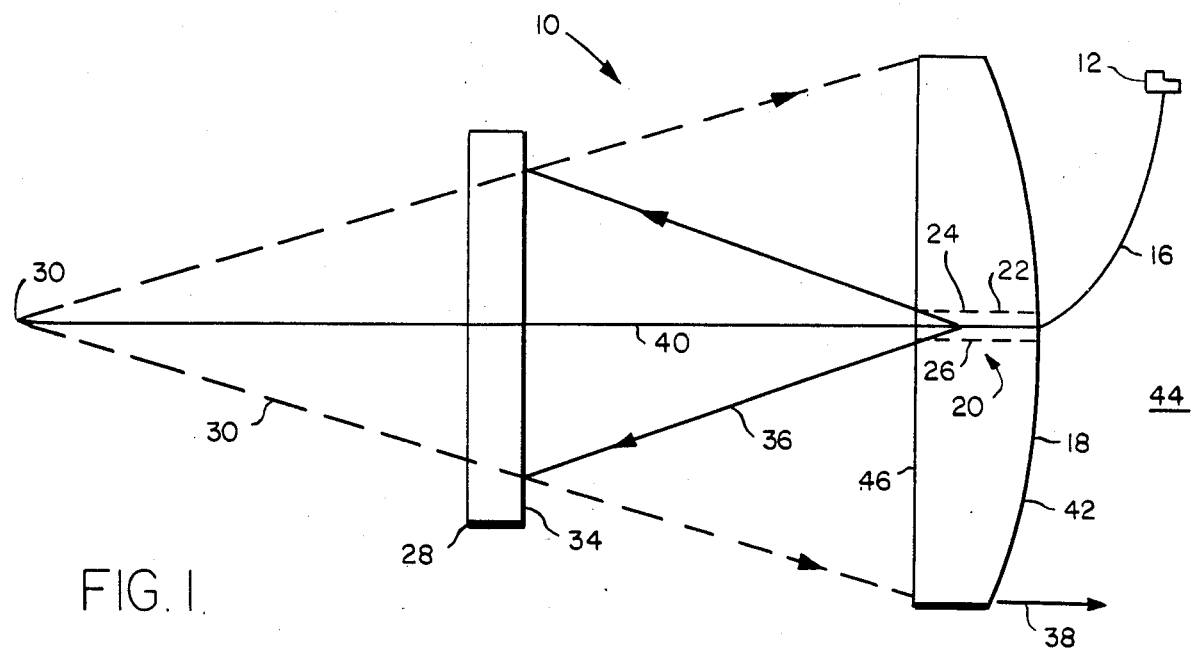
FIG. 1 illustrates the collimated alignment reference device of the present invention.

Referring to FIG. 1, an alignment reference device 10 is shown without supporting structure.

Figure 2:
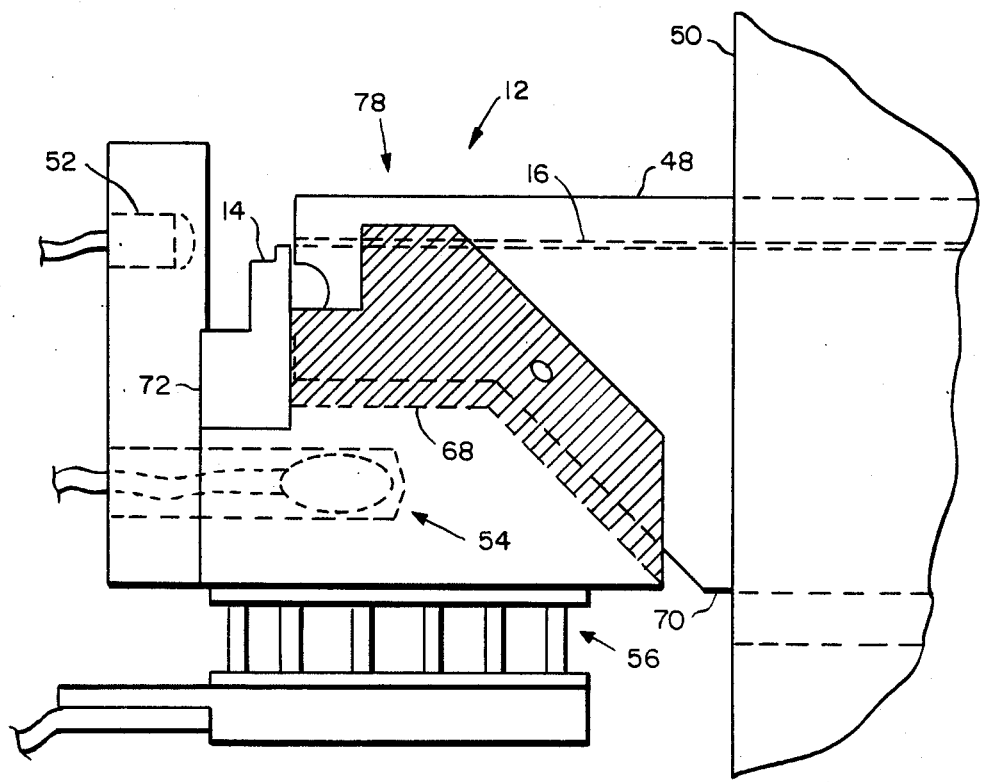
FIG. 2 illustrates the laser diode and optical fiber assembly of the present invention.

A source of laser energy such as laser diode 14, shown only partially in FIG. 2, outputs a laser beam into a single mode optical fiber 16. Optical fiber 16 having an output end 20 is affixed in a lens 18 by means of epoxy, for example. The end 22 of output end 20 acts as a source 24 of radiant energy for alignment reference device 10. End 22 is affixed at a position in lens 18 that corresponds to a focal point 26 to lens 18 when a mirror 28 reflects a beam 30 back into lens 18 such that at imaginary focal point 32 is equidistance from a flat mirror surface 34 as the real focal point 26. Optical fiber 16 outputs a divergent beam 36 that is reflected off mirror 34 and passes through lens 18 to form a collimated beam 38 being parallel to the optical axis 40 of lens 18. Clearly, since radiant energy source 24 is fixed relative to lens 18, the amount of angular deviation occuring during operation will be substantially less than that experienced by a conventional collimated beam source. Further, alignment reference device 10 is more compact since mirror 28 places the focal point 26 inside lens 18. Lens 18 in the present invention is a single element, plane-convex lens that is corrected for spherical aberration by aspherizing. Lens 10 has a curved surface 42 on the collimated output side 44 of lens 18. The curved surface 42 could also be put on the finite conjugate input side. Doing this requires considerably more aspherizing, but this does offer two important advantages. One is that the flat side 46, being on the collimated output side in this instance, would provide a useful reference surface during the assembly and alignment process. The other, and possibly more significant advantage is that the nodal point 26, being near the curved surface 42, requires a greater penetration of the fiber optic source 24 into lens 18. This should provide greater stability of fiber 20 relative to the lens 18. Thus, another embodiment is that where the flat surface 46 is on the output side 44.

Due to the large expected differences in temperature between device 10 and the operational environment lens 18 must be mounted such that it is not deformed by its mounting hardware, not shown, during operation. Mounting hardware having three pads, providing radial-only flexibility based on a 10° F. change in temperature, results in a maximum of 1 lb. of radial force on lens 18.

The four following types of collimating lenses 18 are considered in detail:

(1) A conventional single element lens with spherical surfaces;

(2) An aspherized modification of the above lens to correct for spherical abberation;

(3) A single element lens with a hyperboidal surface toward the object and a flat surface on the collimated output side 44; and (4) An off-the-shelf, two-element cemented achromat.

Each of these lens systems was evaluated by geometric ray tracing. The first lens was a single element, 2-inch diameter, f/8, fused silica lens with spherical surfaces of the optimum 6 to 1 "best form" ratio of curvatures. Ray tracing at the best focus showed about 30 arc seconds of beam divergence caused by spherical aberration, an unacceptably large amount.

The second lens considered was a modification of the above lens by a second order aspherizing of the output surface to eliminate the aberration. This was done by ray tracing by empirically changing the eccentricity of the surface until the aberration was minimized. A reduction of the abberation below one arc second was achieved (less than the diffraction limit of about 4 arc seconds) the optimum eccentricity was 0.987 (an ellipsoid). A simplifying modification of this lens was to put a flat surface on the object side and search for a new optimum eccentricity. The eccentricity in this case was 0.764. As expected, the required amount of aspherizing of the lens that deviated from the best form configuration was greater. The amount of material removed from the edge of the lens was 0.00017 and 0.00019 inches respectively. This small difference did not seem to justify the second curved surface.

A theoretically perfect collimater can be achieved with a single element with one curved surface by making the surface on the object side a hyperboloid. The eccentricity of this hyperboloid turns out to be exactly the same value as the index of refraction of the lens material. The only apparent disadvantage of this system is the relatively large amount of aspherizing required: 0.00096 inches at the edge of the lens (compared to 0.00019 for an ellipsoidal correction on the other side). There are, however, two advantages of this system: One is that the surface on the collimated output side of the lens is flat. This provides a convenient reference surface for comparison to the output beam. Another is that the nodal point is at the vertex of the curved side thus providing a large penetration of the object source into the lens which would facilitate its mounting.

The fourth system considered was an off-the-shelf achromat (cemented doublet). Since the prescriptions for commercially available achromats are not readily available, an achromat equivalent to one commercially available was first designed. This lens was then ray traced at 0.83 microns at the best focus for that wavelength. The results were quite good with less than one arc second of beam divergence. One advantage of an achromat is the relatively small amount of defocusing required in going from one wavelength to another, even over wavelength ranges well beyond its design range. The main disadvantage of a cemented doublet is the structural uncertainty of a two-piece assembly, particularly from thermal distortions due to the contacting of two different materials.

For all of the above systems an experimental nodal point was determined. This was done by iterative ray tracing, varying the position of the object source relative to the lens (keeping the folded distance constant at the best focus) until a position was found which resulted in a one-to-one correspondence between mirror rotation and average deviation of the output beam. That is, for a given rotation of the folding flat, the centroid of a reimaged output beam, which now contains off axis aberrations, would show a displacement exactly equivalent to the amount that the flat was rotated.

For all of the above systems tested this experimental nodal point occurred within the lens, near its theoretical nodal point. The lens selected for the present invention is shown in FIG. 1. It is a two-inch diameter (clear aperture), f/10, fused silica, plano convex lens 18 with the correction on the side requiring the least aspherizing.

Referring to FIG. 2, source 12 of laser energy has a laser diode 14 therein that outputs laser energy into optical fiber 16 that is mounted in a body 48 that is further attached to a lens mount 50. Also attached thereon is a PIN photodiode 52, a thermister 54, and a thermoelectric cooler 56 the operation of which is to be explained hereinafter. Reference is made to the functional block diagram of the means for controlling the laser diode 14. At a particular current the output of laser diode 14, both with respect to wavelength and intensity, changes with temperature. Wavelength changes are thought to be the most damaging since it is suspected that this may change the centroid of the image by altering the interference speckle pattern.

In the operational environment the local temperature will be near sub-zero and thus turning on the laser diode 14 at temperatures far below its selected operating temperature, unless the current is reduced, can cause the laser diode 14 to fail. The reason for this is that at a given current, as the temperature is reduced, the output of the laser diode 14 increases. Failure can occur when the laser mirrors, on the laser diode 14, are no longer able to dissipate the heat. Consequently, if the turn-on temperature is considerably below the operating temperature, a means of either reducing the current or preventing diode turn-on until the diode has reached its operating temperature must be provided.

Either an open or closed-loop temperature control may be used. An alternative to closed-loop temperature control would be to bias the diode current (and overcurrent set point) in an open-loop fashion as a function of diode temperature. This could keep the intensity relatively constant, (precisely constant if intensity control is incorporated, in which case, only the overcurrent set point would require temperature biasing), but this would change the wavelength to a certain degree that may also affect the beam centroid direction as a function of diode temperature.

Whether under active control or not, laser diode 14 should operate at a temperature near that of the local operational environment. Since this will probably be considerably lower. In light of the above, laser diode 14 output intensity is maintained constant using a PIN photodiode 52 in a closed loop circuit 58, FIG. 5, that varies the diode current. But if the temperature of the diode 14 is maintained constant it should only be required that the current be reasonably constant to assure a stable output intensity (assuming, of course, that the diode characteristics do not change with time). Moreover, even rather large changes in intensity should not result in a change in the apparent centroid position, so long as the output wavelength does not change and the centroiding algorithm and detector can accommodate intensity variations.

Figure 5:
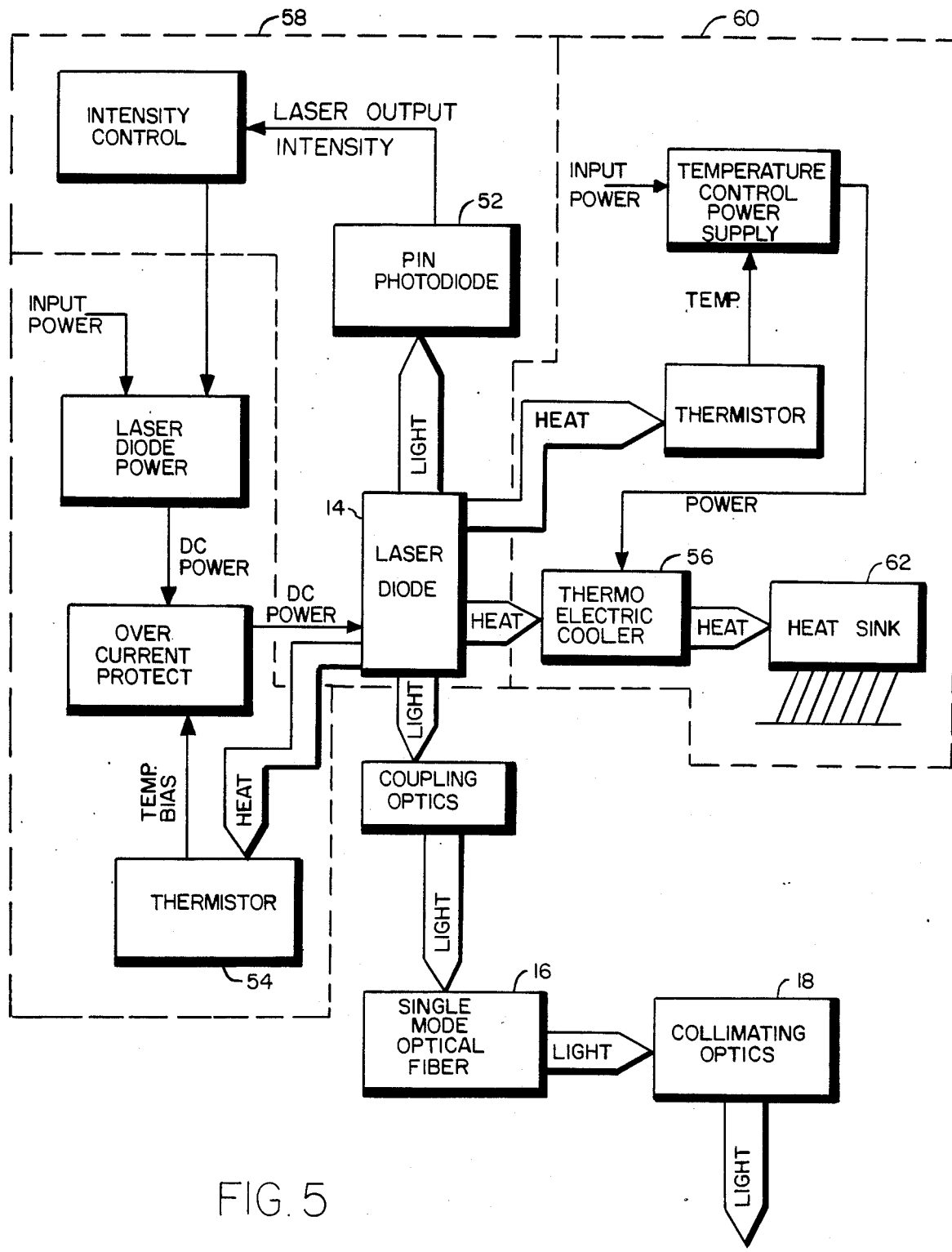
FIG. 5 illustrates by functional block diagram the electronic means of connecting the alignment reference assembly.

Laser diode 14 and its temperature control circuit 60, FIG. 5, will result in local heating that is harmlessly removed by uncontrolled radiation and mostly by controlled conduction by providing a conductive path from the diode 14 to a heat sink 62. The total amount of heat to be removed is expected to be about 2 watts maximum (only about 0.3 watts if active temperature control is not used). Since this conductive path must necessarily have considerable mass relative to the diode assembly this path must be such that excessive static and dynamic loads are not placed on diode assembly 12.

Laser diode 14 can be very rapidly destroyed if excessive current is applied. The failure mode appears to be that of destruction of the laser mirrors caused by the inability to dissipate the absorbed light energy. Consequently, a laser diode power supply 64 must be such that there is absolutely no possibility of an intermittant or continuous overcurrent.

As to laser diode 14, an exiting beam, not shown, from the end 22 of output end 20 has a Gaussian intensity distribution across a far field aperture; consequently, to provide radial symmetry of the collimated output beam 38 the fiber 16 must be mounted relative to the lens 18 such that the diverging cone 36 has radial symmetry to the lens' optical axis 40 and that the nominal position of the folding mirror 28 be normal to the lens axis 40.

Figure 4:
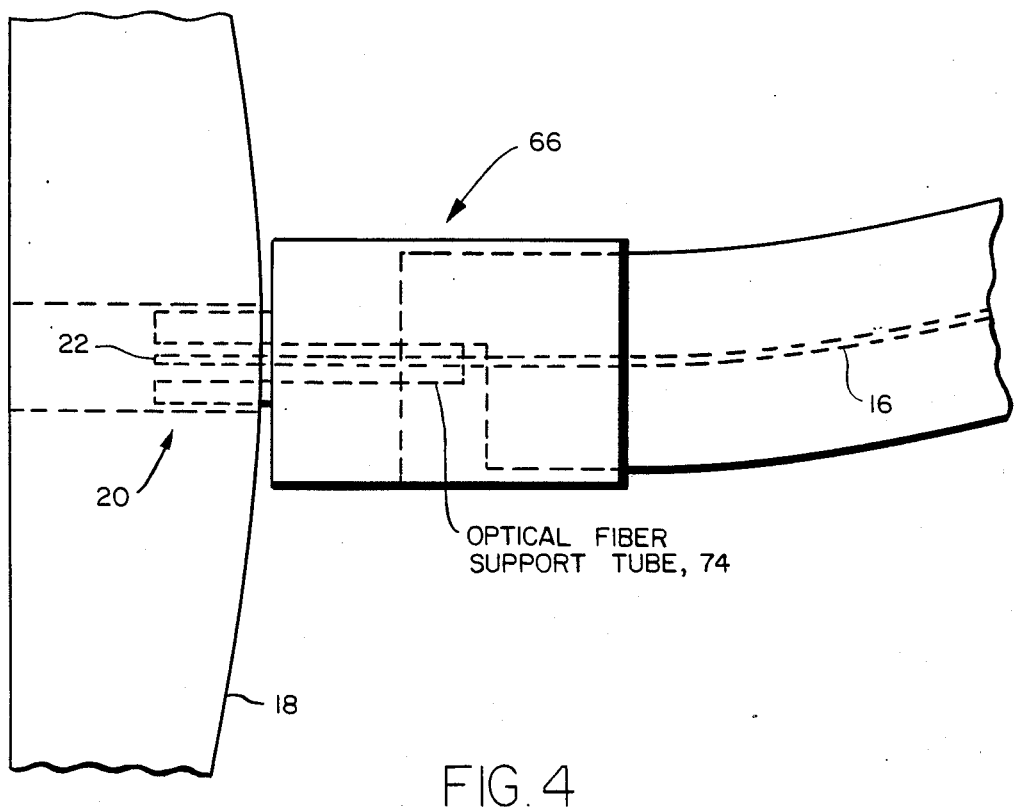
FIG. 4 illustrates the manner of connecting the optical fiber to the lens of the present invention.

To achieve this, the fiber-to-lens assembly fixture 66, FIG. 4, must provide means of measuring the radial symmetry of the output cone 36 relative to the axis 40 of the lens 18. This also places a tolerance constraint on the fabrications of the lens in that the lens must be well centered to assure that the flat surface 46 of the lens 18 is perpendicular to the lens' optical axis 40.

The fact that the collimated beam 38 has a Gaussian aperture distribution must also be taken into consideration when calculating diffraction spot sizes in the focal planes. The light emitted from end 22 of the optical fiber 16 is highly polarized. This must be considered during the design of the relay optical system, particularly the effect on beamsplitters. This initial polarization can be used constructively by using polarizing beamsplitters to increase the "selectivity" of the alignment beams relative to the other beams.

The diode assembly 12 is mounted on an end 68 of a relatively flexible cantilever 70. Also, the mass of the diode assembly 12 is necessarily large in order to incorporate the temperature and intensity control circuits 58 and 60. Thus, the operational design should accommodate the vibration spectrum to which it will be subjected. The laser diode 14, not shown, is a lasing chip mounted on a small copper block 72. This block 72 is mounted onto an intermediate fixture such as cantilever 70. This results in a smaller and more stable laser diode assembly 12.

The optical fiber 16 used is of the single mode type produced by Corning Glass Works. A single mode fiber 16 is required for this application to provide temporal consistency across the output beam (i.e., absence of varying speckle patterns). The actual grade index core of this fiber 16 is about 9 microns with an effective size of about 5 microns at 0.83 microns wavelength. But since its re-imaged size is considerably enlarged by diffraction and since it is necessary to have a relatively large image because of the resolution element size of the detectors, a much larger core size could be tolerated if it provided the required output uniformity. Therefore, other types of single mode fibers are possible.

Figure 3:
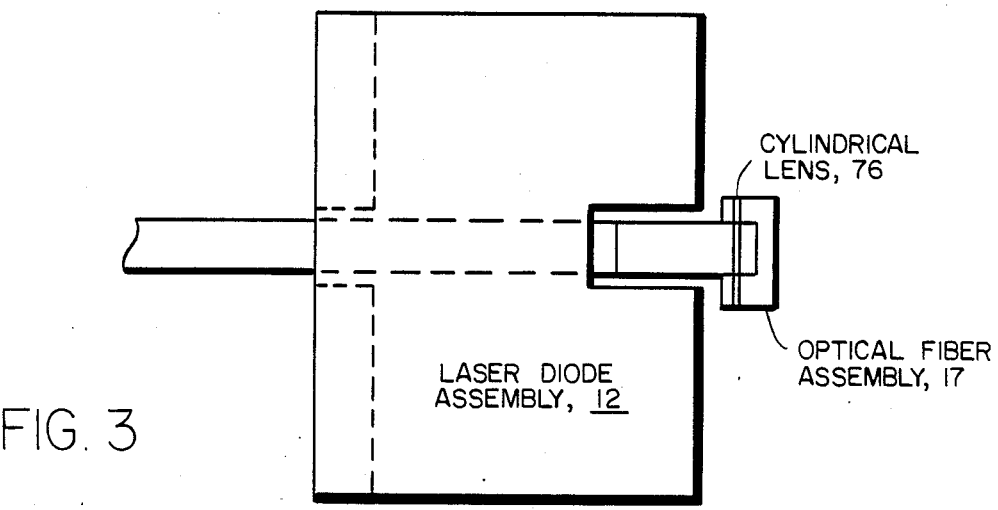
FIG. 3 illustrates the method of connecting the optical fiber to the laser diode of the present invention.

Referring to FIGS. 2 and 3, initial tests demonstrated a coupling efficiency of about 20% when using a 0.001 inch fiber as a cylindrical coupling lens 76. End 22 of the single mode fiber 16 (SMF) was cleaved and polished. End 22 of fiber 16 was hand polished in several stages from grinding with #600 wet or dry sandpaper to final polishing with 0.3 micron Lande A polishing compound on a nylon cloth lap. After about six hours of polishing per surface the fibers were again coupled to a laser diode as before. The coupling efficiency has increased to that of a cleaved end, indicating that no more could be gained by further polishing.

FIGS. 2 and 3 show a diode/fiber assembly 78. This embodiment requires a gap between fiber 16 and diode assembly 12 and optical fiber assembly 17. Diode 14 is coupled to the optical fiber 16 with a cylindrical lens 76 (portion of 0.001 inch fiber). Since the beam divergence out of diode 14 is determined by diffraction from a rectangular lasing window, an anamorphic lens system is required to condition the laser output prior to entry into the fiber. The goal is to insert as much of the laser light as possible into the 5 micron effective core *and* within the angle of acceptance of fiber 16. It is because of this minimum acceptance angle that a lens 76 of this type can increase the coupling efficiency over that of simply butting the fiber against (but not quite touching) laser diode 14. Although less energy actually enters fiber 16 with lens 76, a much higher percentage is within the acceptance angle (numerical aperture).

For cylindrical lens 76 with a particular diameter and index of refraction, a theoretical coupling efficiency can be calculated. The 0.001 inch lens 76 was used because it was readily available. Its theoretical coupling efficiency is about 40%. However, if the theoretically optimum lens is used this increases to 80 percent. The output of laser diode 14 diverges by about 45 degrees in one direction and about 10 degrees in the other due to diffraction from the approximately 0.2 by 18 micron lasing window, not shown. The active direction of the cylindrical coupling lens 76 is used in the 45 degree laser direction to increase the percentage of rays that enter the core of the single mode fiber 16 within its minimum acceptance angle.

The theoretical coupling considers only those rays in a plane in the 45 degree direction which are emitted from the 0.2 micron lasing dimension. The calculation for maximum efficiency also assumes that cylindrical coupling lens 76 is in contact with the laser on one side and with fiber 16 on the other. Due to the relative sizes between the laser and fiber 16 most of the optical activity of the coupling lens 76 occurs at the surface of coupling lens 16 on its fiber side. But if, in reality, coupling lens 76 were to physically touch the laser mirror, the laser would probably be destroyed. Consequently, the ideal position must be compromised somewhat by instead putting lens 76 as close to laser 14 as possible. Because of possible damage, the coupling method was changed by optically merging cylindrical lens 76 to the fiber 16 by filling the space between them with optical cement. This effectively removes the curved surface on the fiber side which requires that the other side, now being the optically active side, must be pulled away from laser 14 by about the diameter of the coupling lens 76. Since the lens 76 can be used in its most favorable position without the risk of damaging laser 14 and since the Fresnel losses at the two merged surfaces are now eliminated, this change resulted in essentially no loss in coupling efficiency. This change also results in a mechanically better system because there is no unsupported length of coupling fiber.

The actual merging of the two surfaces is somewhat difficult to achieve, however, since the optical cement wants to creep over to the other side of the fiber reducing the entire cylindrical lens to a blob of cement optically. Success was achieved by putting a very thin layer of ultraviolet curing cement on both sides, and up to about 0.005 inches from the fiber 16, on the horizontal polished surface containing the appropriate end of the fiber 16. The coupling fiber, having been aligned and then withdrawn upward, is then lowered to the surface and then pulled along the surface and through the cement until just enough cement, as observed through a microscope, has been pulled along the length of the coupling fiber to fill the space between it and the fiber 16. This is critical since any excess cement at this point will creep over the other surface and the entire cementing process will have to be repeated.

Proper alignment is observed with the microscope by shining an HeNe Laser into the other side of fiber 16 and observing the resulting spot through the coupling fiber. Precise alignment can be observed only if the microscope is defocussed away from the fiber 16 until a large portion of the field of view is filled with the defocussed spot. If this is not done it is impossible to resolve in the focussed point when the coupling fiber is in optimum alignment relative to the core of fiber 16, especially after the cement has cured since then it is no longer possible to scan the coupling fiber across fiber 16. But when defocussed, the resulting large spot is symmetrically uniform only at the "exact" peak of alignment. As the fiber is moved off peak ever so slightly one side of the spot progressively vanishes making it relatively easy to observe small amounts of misalignment.

When perfect alignment has been achieved, the cement is cured by exposure to UV light. About half the time the coupling fiber 76 would shift enough out of alignment during the curing of the cement to require that coupling fiber 76 be removed and another attempt made. In these cases the coupling fiber 76 was removed with a razor blade, trying not to damage the fiber 16, the surface cleaned with acetone, and then the fiber 16 was examined under a metallurgized microscope. If the surface uppeared damaged it had to be repolished before another attempt was made.

The fixturing, not shown. consisted of a coupling fiber support that held a two-inch length of the fiber in spring tension mounted on a three-axis stack of Lansing translators with differential micrometers. After the cylindrical coupling lens 76 is cemented relative to the single mode fiber 16, this assembly 17 is cemented to the laser diode assembly 12. FIG. 3. The fiber assembly 17 fits into a pair of orthogonal grooves in the diode assembly 12 where it is epoxied in place as shown in FIG. 3.

The clearance in the groove is only about 0.01 inch to minimize the amount of epoxy required but enough to allow some adjustment during the final alignment process. Also if the fiber assembly 17 is not reasonably well centered in groove 82 when aligned relative to the diode 14, then diode 14 must be repositioned and the alignment process repeated. Doing this provides for an equal thickness of epoxy on both sides of the fiber assembly 17. Although the small clearance in groove 82 makes the alignment process more difficult it should provide a much more rigid assembly and also should minimize the misalignment caused by the curing epoxy. The epoxy used has a fairly high viscosity which makes for difficulty in getting it into groove 82, but because of this high viscosity it does not tend to creep by itself into the space between the diode 14 and the fiber 16. But during the positioning process extreme care must be taken so that displaced epoxy is not forced between the diode 14 and the fiber 16. The most difficult part of the entire process is to maintain the alignment between the fiber assembly 17 and the diode assembly 12 during the curing of the epoxy. Unless this is done on a very stable optical bench (granite) in a temperature controlled room, success will be nearly impossible to achieve. The output of the fiber is constantly monitored during the curing process and adjustments made to maintain the alignment. The adjustments were made with PZT translators on the two lateral axis of the three axis Lansing mount with which the diode assembly could be moved relative to the fiber assembly.

After the epoxy has fully cured the laser diode 14 can be further secured in the mount by putting a small amount of a low viscosity epoxy around the diode block 72, being very careful not to move the diode 14 or get epoxy on the laser chip. The epoxy can be delicately applied using a length of optical fiber.

The cements used were:
(a) encapsulate single mode fiber 76—Emerson and Cuming (E&C) Stycast 1266
(b) cement cylindrical lens 76 to fiber assembly 17—Norland 61 optical adhesive
(c) cement fiber assembly 17 to diode assembly 12—(E&C) Stycast 2850-FT (catalyst 9)
(d) secure laser diode block 72—(E&C) 1266
(e) mount thermal cooler 56—(E&C) 2850-FT
(f) mount pin photodiode 52—(E&C) 2850-FT
(g) encapsulate thermal sensors 54—(E&C) 2850-FT
(h) cement P.C. boards to diode assembly 12—(E&C) 1266
(i) cement diode/fiber assembly to lens assembly—(E&C) 1266 (unit #1)—plaster of Paris (unit #2)
(j) mount collimating lens 18 in lens assembly—(E&C) 1266

The last part of the assembly process is to cement the laser diode 12/fiber assembly 17 (78) to collimating lens 18. See FIG. 4.

The light emitting fiber 16 is an approximately f/10 beam with a far field Gaussian intensity distribution. Prior to cementing the two assemblies together they are aligned relative to each other such that the beam emitted by fiber 16 is symmetrically uniform about the optical axis of the collimating lens 18. The optical axis is considered to be the line perpendicular to the flat surface of the lens centered on the fiber 16 in its position in the approximate center of the hole in the lens 18.

The alignment procedure is to first establish a line with an HeNe laser that is centered on the end of fiber 16 about which the exiting beam from fiber 16 is made symmetrical as observed on target at the HeNe laser. This is achieved by a trial and error process of shifting and rotating the HeNe until the fiber assembly 17 meets the above condition. Then the collimating lens 18 assembly, not shown, is interposed such that a portion of its flat surface is in the HeNe beam. The lens assembly is then rotated about two horizontal axis until the HeNe beam is folded back on itself and then shifted laterally until fiber 16 is aligned with the hole in the lens. Note that since the lens assembly must be rotated relative to the fiber-to-lens assembly 66 about an axis perpendicular to the hole in the lens, the hole must be sufficiently oversized to allow for this. Then epoxy is put on the fiber-to-lens assembly 66 and fiber-to-lens assembly 66 is carefully lowered into the hole in the lens. After lowering the fiber-to-lens assembly 66 into position, epoxy is also put into the groove in the lens mount to secure the diode end of the fiber-to-lens assembly 66. Note that it is at this end that essentially all of the support for the fiber-to-lens assembly 66 occurs.

After the epoxy cures, the heat conducting strap and electrical cables are attached rigidly to the lens mount and pre-formed such that minimum stress is placed on the diode assembly 12.

A second unit was assembled using plaster of Paris rather than epoxy. Plaster of Paris produces a very rigid bond with the big advantage that the assembly can be fairly easily taken apart. If epoxied, a component failure would require that the entire assembly, which includes a very expensive lens, be scrapped.

Clearly, many modifications and variations of the present invention are possible in light of the above teachings and it is therefore understood, that within the inventive scope of the inventive concept, the invention may be practiced otherwise than specifically claimed.

What is claimed is:

1. A collimated reference beam source, said source comprising:
    a laser assembly, said laser assembly outputting a laser beam from a laser source;
    an optical fiber assembly, said optical fiber assembly having therein a single mode optical fiber, said single mode optical fiber receiving said laser beam from said laser assembly, said optical fiber assembly having an optical fiber-to-lens assembly, said optical fiber passing through said fiber-to-lens assembly in a fixed manner;
    a lens system, said lens system having said fiber-to-lens assembly fixedly attached thereto, said optical fiber passing through said fiber-to-lens assembly and terminating with an end acting as a source of laser energy, said end of said fiber being positioned on an optical axis of said lens system and at a nodal point of said lens system being a real focus point, said end of said optical fiber outputting a divergent laser beam; and
    a mirror, said mirror being positioned one half focal length from said lens system, said mirror being perpendicular to said optical axis of said lens system whereby said divergent laser beam is reflected back into said lens system, said lens system outputting a collimated beam of laser energy having minimal angular divergence as a result of relative movement between said end of said optical fiber, said lens system, and said mirror.

2. A collimated reference beam source as defined in claim 1 wherein said laser assembly includes:
    a laser output intensity control circuit, said intensity control circuit receiving a laser beam from said laser, and outputting a DC power signal;
    a power supply, said power supply controlling the current to said laser, said power supply having input said DC power supply signal and a heat signal from said laser, in response to said heat signal and said DC power supply signal, said power supply outputs an adjusted DC power signal to said laser; and
    a temperature control circuit, said temperature control circuit controlling the amount of heat flow from said laser whereby optimum operating conditions are maintained.

* * * * *